(12) United States Patent
Lu

(10) Patent No.: US 7,848,907 B2
(45) Date of Patent: Dec. 7, 2010

(54) **SYSTEM AND METHOD FOR MODELING STOCHASTIC BEHAVIOR OF A SYSTEM OF *N* SIMILAR STATISTICAL VARIABLES**

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 11/828,372

(22) Filed: Jul. 26, 2007

(65) Prior Publication Data

US 2009/0030663 A1    Jan. 29, 2009

(51) Int. Cl.
*G06F 17/10* (2006.01)
(52) U.S. Cl. .......................................................... 703/2
(58) Field of Classification Search ........................ 703/2
See application file for complete search history.

(56) References Cited

U.S. PATENT DOCUMENTS

2006/0100873 A1\* 5/2006 Bittner et al. ............ 704/256.2

OTHER PUBLICATIONS

J. Watts, N. Lu, C. Bittner, S. Grundon and J. Oppold "Modeling FET variation within a chip as a function of circuit design and layout choices," Proc. NSTI Nanotech, Workshop Compact Modeling, 2005, pp. 1-25, obtained from http://www.nsti.org/Nanotech2005/WCM2005/WCM2005-JWatts.pdf.\*

\* cited by examiner

*Primary Examiner*—Hugh Jones
(74) *Attorney, Agent, or Firm*—Richard Kotulak; Roberts Mlotkowski Safran & Cole, P.C.

(57) ABSTRACT

A system and method for modeling stochastic behavior of a system of N similar statistical variables using N uncorrelated/independent random model parameters. More particularly, a system and method of modeling device across chip variations and device mismatch. The method includes modeling stochastic behavior of a system of N similar statistical variables using N uncorrelated/independent random model parameters. The method includes providing a system of N similar statistical variables, wherein each stochastic variable has a same standard deviation. The method further includes partially correlating each and every pair of stochastic variables among N variables, wherein a degree of partial correlation is a same for all pairs of variables. A statistical model is constructed to represent a system of N stochastic variables in which only N independent stochastic model parameters are used. A one-to-one mapping relation exists between N model parameters and the N variables. The method further includes finding unique values of the N model parameters given a set of values of the N variables. Reversely, the method also includes finding the values of the N variables given a set of values of the N model parameters.

15 Claims, 7 Drawing Sheets

SYSTEM AND METHOD FOR MODELING STOCHASTIC BEHAVIOR OF A SYSTEM OF N SIMILAR STATISTICAL VARIABLES

FIELD OF THE INVENTION

The invention generally relates to a system and method of modeling stochastic behavior of a system of N similar statistical variables using N uncorrelated/independent random model parameters, more particularly, it relates to a system and method for modeling semiconductor device across chip variations (ACV) and device mismatch and for modeling macro models for VLSI logic delay circuits.

BACKGROUND OF THE INVENTION

As the feature size of semiconductor devices becomes smaller and smaller, the variations in a semiconductor device and VLSI circuit become larger and larger. Variations include systematic variations and random variations. Random variations (uncorrelated variations) affect relative characteristics of closely placed identical devices (often called matching or mismatch), and also affect the relative characteristic of identical devices and circuits placed in several locations within a die (often called across chip variations).

Other circuit and device examples involving random variations include the mismatch among multiple identical NFETs used in a ring oscillator, the mismatch among multiple identical PFETs used in a ring oscillator, and the mismatch among multiple identical fingers in a multi-finger (RF) FET or MOS varactor. From the view point of modeling, systematic variations moves all instances of a device (e.g., all NFET gate oxide thickness) together, and there is no relative difference between any two instances of a devices. This is essentially a one-body (one-instance) statistical modeling problem.

On the other hand, random variations move each instance differently from any other instances (e.g., FET Vt variation caused by random doping fluctuations, the random ACV part of FET channel length variation, mismatch among a group of nearby and identical resistors), and the relative difference between any two instances are the very subject of ACV/mismatch modeling. This is a two-body (two-instance) statistical modeling problem.

For a given device length and width, the known Monte Carlo model for ACV/mismatch is usually straightforward. However, the known Monte Carlo model is not an irreducible representation, i.e., is not the most compact representation. For example, for a two-instance case, the Monte Carlo model is in a three-dimensional space, and there is no one-to-one mapping relation between instance values and their representation in Monte Carlo simulation space. Although it does not affect Monte Carlo simulation results, this does lead to inferior corner models, due to their low joint probability. Also, this extra dimension causes a lot of confusion and uncertainty on which corner is the needed corner, due to the lack of a one-to-one mapping relation. These are explained in details in the following examples of known Monte Carlo statistical model for mismatch/across-chip variations (ACV).

EXAMPLE 1

A first example is for a resistor (e.g., a diffused resistor or a poly resistor) of a given length and width. As shown in FIG. 1, the measured total resistance values over many lots/wafers/chips or over a certain time period can be plotted in a histogram. That is, the histogram shows a resistance distribution. In this case of 7 histogram bars (i.e., 7 brackets), bracket width is one sigma ($\sigma$), the probability at the center is 38%, one standard deviation ($1\sigma$) away from the center is 24%, $2\sigma$ away from the center is 6%, and $3\sigma$ away from the center is 1%. The Monte Carlo statistical model for resistor instance i can be written as:

$$R_i = r_0 + G(\sigma_s) + g_i(\sigma_r), i=1, 2, 3, \ldots,$$

where $r_0$ is the nominal/average resistance value, $\sigma_s$ is the standard deviation of systematic part of resistance variation, and $\sigma_r$ is the standard deviation of random part of resistance variation. Also, each of $G(\sigma)$, $g_1(\sigma)$, $g_2(\sigma)$, $g_3(\sigma)$, ... is an independent stochastic variable with a Gaussian distribution of zero mean and standard deviation of $\sigma$. The total standard deviation of resistance is:

$$\sigma_R = \sqrt{\sigma_s^2 + \sigma_r^2},$$

which is the same for all resistor instances. For the difference (i.e., mismatch) between any two resistor instances i and j, $$R_i - R_j = g_i(\sigma_r) - g_j(\sigma_r), i \neq j, i,j=1, 2, 3, \ldots,$$

its expectation value is zero, $$\langle R_i - R_j \rangle = 0, i \neq j, i,j=1, 2, 3, \ldots,$$

and the standard deviation of the mismatch is:

$$\langle (R_i - R_j)^2 \rangle^{1/2} = \sqrt{2}\sigma_r, i \neq j, i,j=1, 2, 3, \ldots.$$

EXAMPLE 2

In a second example, for the channel length of a FET device (e.g., regular Vt, thin oxide NFET), measured (or assumed) channel length distribution can be plotted in a histogram as shown in FIG. 2. In FIG. 2, seven (7) histogram bars (i.e., 7 brackets) are shown. The bracket width is one sigma ($\sigma$), the probability at the center is 38%, one standard deviation ($1\sigma$) away from the center is 24%, $2\sigma$ away from the center is 6%, and 3 s away from the center is 1%.

The Monte Carlo statistical model for FET instance i is typically modeled as:

$$L_i = l_0 + G(\sigma_s) + g_i(\sigma_r), i=1, 2, 3, \ldots.$$

where $l_0$ is the nominal/average FET channel length, $\sigma_s$ is the standard deviation of systematic part of channel length variation, and $\sigma_r$ is the standard deviation of random part of channel length variation. The total standard deviation of channel length is:

$$\sigma_L = \sqrt{\sigma_s^2 + \sigma_r^2},$$

which is the same for all FET instances. For the difference (i.e., mismatch) between any two FET instances i and j, $$L_i - L_j = g_i(\sigma_r) - g_j(\sigma_r), i \neq j, i,j=1, 2, 3, \ldots,$$

its expectation value is zero, $$\langle L_i - L_j \rangle = 0, i \neq j, i,j=1, 2, 3, \ldots,$$

and the standard deviation of the mismatch is:

$$\langle (L_i - L_j)^2 \rangle^{1/2} = \sqrt{2}\sigma_r, i \neq j, i,j=1, 2, 3, \ldots.$$

Other examples include metal-insulator-metal (MIM) capacitor, FET threshold voltage (Vt), etc.

Joint Probability Distribution

FIG. 3 shows a histogram plot of a two-dimensional joint probability distribution for two un-correlated parameters. For example, the joint probability distribution for resistance and FET channel length. When compared with one-dimensional histogram plots shown in FIGS. 1 and 2, it is easy to see that the probability in a histogram bar in the 2D case is significantly smaller than the corresponding histogram bar in the 1D case.

In FIG. 3, the histogram is of a two-dimensional joint probability distribution for two uncorrelated parameters (e.g., the joint probability distribution for resistance and FET channel length). In this case of 7×7=49 histogram bars (i.e., 49 brackets), bracket size is one-sigma by one-sigma (1σ×1σ), the probability at the center is 15%, one-direction 1σ away from the center is 9%, one-direction 2σ away from the center is 2%, and both direction is away from the center is 6%. The results are as follows:

| 0.00 | 0.00 | 0.00 | 0.00 | 0.00 | 0.00 | 0.00 |
|------|------|------|------|------|------|------|
| 0.00 | 0.00 | 0.01 | 0.02 | 0.01 | 0.00 | 0.00 |
| 0.00 | 0.01 | 0.06 | 0.09 | 0.06 | 0.01 | 0.00 |
| 0.00 | 0.02 | 0.09 | 0.15 | 0.09 | 0.02 | 0.00 |
| 0.00 | 0.01 | 0.06 | 0.09 | 0.06 | 0.01 | 0.00 |
| 0.00 | 0.00 | 0.01 | 0.02 | 0.01 | 0.00 | 0.00 |
| 0.00 | 0.00 | 0.00 | 0.00 | 0.00 | 0.00 | 0.00 |

General Representation

For a device parameter or a model parameter F with both systematic/correlated/global/inter-die variation and random/uncorrelated/local/intra-die variation, it's Monte Carlo statistical model can be written as:

$$F_i = f_0 + \sigma_s G + \sigma_r g_i, \quad i=1, 2, 3, \ldots \quad (1)$$

where $f_0$ is the nominal/average value of the parameter F, $\sigma_s$ is the standard deviation of systematic/correlated variation, and $\sigma_r$ is the standard deviation of random/uncorrelated variation. Also, each of $G, g_1, g_2, g_3, \ldots$ is an independent stochastic variable with a Gaussian (i.e., normal) distribution of zero mean and standard deviation of 1. The total standard deviation of $i^{th}$ instance of the parameter F (one-body statistics) is:

$$\langle (F_i - \langle F_i \rangle)^2 \rangle^{1/2} = \sigma_F, \quad i=1, 2, \ldots, N, \quad (2)$$

where $$\sigma_F = \sqrt{\sigma_s^2 + \sigma_r^2}, \quad (2b)$$

which is the same for all instances. For the difference (i.e., mismatch) between any two instances i and j, $$F_i - F_j = \sigma_r(g_i - g_j), \quad i \neq j, \, i,j=1, 2, 3, \ldots,$$

its expectation value is zero, $$\langle F_i - F_j \rangle = 0, \quad i \neq j, \, i,j=1, 2, 3, \ldots,$$

and the standard deviation of mismatch (two-body statistics) is $$\langle (F_i - F_j)^2 \rangle^{1/2} = \sqrt{2}\sigma_r, \quad i \neq j, \, i,j=1, 2, 3, \ldots, N. \quad (3)$$

Notice that $\langle F_i \rangle = f_0$. The linear correlation coefficient between the two instances i and j is $$r_{ij} = \frac{\langle (F_i - f_0)(F_j - f_0) \rangle}{\langle (F_i - f_0)^2 \rangle^{1/2} \langle (F_j - f_0)^2 \rangle^{1/2}}$$

$$= \frac{\langle (F_i - f_0)(F_j - f_0) \rangle}{\sigma_F^2},$$

$i \neq j,$ $i, j = 1, 2, 3, \ldots$

Taking the square of both sides of the equation 3, $$2\sigma_r^2 = \langle (F_i - F_j)^2 \rangle$$
$$= \langle [(F_i - f_0) - (F_j - f_0)]^2 \rangle$$
$$= \langle (F_i - f_0)^2 - 2(F_i - f_0)(F_j - f_0) + (F_j - f_0)^2 \rangle$$
$$= \langle (F_i - f_0)^2 \rangle - 2\langle (F_i - f_0)(F_j - f_0) \rangle + \langle (F_j - f_0)^2 \rangle$$
$$= \sigma_F^2 - 2\langle (F_i - f_0)(F_j - f_0) \rangle + \sigma_F^2$$
$$= 2\sigma_F^2 - 2\langle (F_i - f_0)(F_j - f_0) \rangle$$
$$= 2\sigma_F^2 - 2\sigma_F^2 r_{ij}$$
$$= 2\sigma_F^2 (1 - r_{ij}),$$

$i \neq j,$ $i, j = 1, 2, 3, \ldots .$

This equation relates to the mismatch correlation coefficient.

$$\langle (F_i - F_j)^2 \rangle = 2\sigma_F^2 (1 - r_{ij}), \, i \neq j, \, i,j=1, 2, 3, \quad (3b)$$

Making use of Equation (2), $$r_{ij} = 1 - \frac{\langle (F_i - F_j)^2 \rangle}{2\sigma_F^2} = 1 - \frac{\sigma_r^2}{\sigma_F^2} = \frac{\sigma_s^2}{\sigma_F^2}, \quad (3c)$$

$i \neq j,$ $i, j = 1, 2, 3, \ldots .$

Now consider a two-instance case. In this example, consider a case in which a device characteristic is mainly/strongly affected by the difference or the ratio of two instances (call them 1 and 2), $$F_1 = f_0 + \sigma_s G + \sigma_r g_1, \quad (4)$$
$$F_2 = f_0 + \sigma_s G + \sigma_r g_2.$$

The required properties are:

$$\sigma(F_1) = \sqrt{\sigma_s^2 + \sigma_r^2} \equiv \sigma_F, \quad (5)$$
$$\sigma(F_2) = \sqrt{\sigma_s^2 + \sigma_r^2} \equiv \sigma_F,$$
$$\sigma(F_1 - F_2) = \sqrt{2}\sigma_r \equiv \sigma_m.$$

These requirements can be represented graphically by an ellipse of 45° angle as shown in FIG. 4.

FIG. 4 is schematic plot of mismatch between two instances $F_1$ and $F_2$ of a device/parameter. Point 2 and point 4 are two points at which mismatch is largest (for a given joint probability density), and are on the ellipse. (But points 1 and 3 are outside the ellipse.) Three vertical dashed lines, from left to right, indicate a lower bound ($f_0-k\sigma_F$), the average/nominal $f_0$, and an upper bound ($f_0+k\sigma_F$) of $F_1$, respectively ($k=1$, 2, or 3, etc.). Three horizontal dashed lines, from bottom to top, indicate a lower bound ($f_0-k\sigma_F$), the average/nominal $f_0$, and an upper bound ($f_0+k\sigma_F$) of $F_2$, respectively.

Two-body Monte Carlo/statistical model (Equation) (4) satisfies the requirements of Equation (5). Notice that Equation (4) contains three independent stochastic variables, and thus is a set of stochastic functions defined in a three-dimensional space ($G$, $g_1$, $g_2$). Going from instance values $F_1$ and $F_2$ to their representation values ($G$, $g_1$, $g_2$), there is a one-to-many mapping relation. Reversely, there is a many-to-one mapping relation. In other words, there is no one-to-one mapping relation between instance values and their representation.

Corners

In a histogram plot on the probability of stochastic variables, histogram bracket width is $\epsilon$ in each direction ($\epsilon \ll 1$), and the probability of corner points 1-4 in FIG. 4 is of the order of $$P_c = \varepsilon^2 (2\pi)^{-1} \exp\left(-\frac{1}{2}k^2\right). \tag{6}$$

Here $k=1$ when corners 1 to 4 in FIG. 4 are 1-$\sigma$ corners, or $k=3$ when corners 1 to 4 in FIG. 4 are 3-$\sigma$ corners.

For a fast-fast or slow-slow corner (point 1 or 3 in FIG. 4), the k-$\sigma$ corner point ($k=1$, 2, 3, etc.) is determined by two planes in the 3-dimension space ($G$, $g_1$, $g_2$), $F_1 = f_0 \pm k\sigma_F$, $F_2 = f_0 \pm k\sigma_F$, namely, $\sigma_s G + \sigma_r g_1 = \pm k\sigma_F$, $\sigma_s G + \sigma_r g_2 = \pm k\sigma_F$. (7)

The intersection of two planes of Equation (7) is a straight line in the 3D space ($G$, $g_1$, $g_2$). It is easy to see that all solutions satisfy the relationship of $g_1 = g_2$, and there are many points satisfying Equation (7). Several sets of solutions are given below:

$G = \pm k\sigma_F/\sigma_s$, $g_1 = g_2 = 0$, (8)

or $G = g_1 = g_2 = \pm k\sigma_F/(\sigma_s + \sigma_r)$, (9)

or $G = \pm k\sigma_s/\sigma_F$, $g_1 = g_2 = \pm k\sigma_s/\sigma_F$. (10)

For a mismatch corner (point 4 or 2 in FIG. 4), the k-$\sigma$ corner point ($k=1$, 2, 3, etc.) satisfies:

$$F_1 - F_2 = \pm k\sigma_m.$$

-continued $$\frac{1}{2}(F_1 + F_2) = f_0.$$

Solving for $F_1$ and $F_2$, $$F_1 = f_0 \pm \frac{1}{2}k\sigma_m, \tag{11}$$

$$F_2 = f_0 \mp \frac{1}{2}k\sigma_m,$$

i.e., $$\sigma_s G + \sigma_r g_1 = \frac{1}{2}k\sigma_m,$$

$$\sigma_s G + \sigma_r g_2 = -\frac{1}{2}k\sigma_m.$$

Here, there are two equations to determine 3 variables. Geometrically, Equation (11) describes two planes in the 3D space ($G$, $g_1$, and $g_2$), and their intersection is a straight line. Equation (11) leads to:

$2\sigma_s G + \sigma_r(g_1+g_2) = 0$, $g_1 - g_2 = \sqrt{2}k$.

Again, there are many points to satisfy Equation (11). For example, $G=0$, $g_1 = -g_2 = k/\sqrt{2}$, (12)

or $G = \sigma_r/(\sqrt{2}\sigma_s)$, $g_1 = \sqrt{2}k$, $g_2 = 0$. (13)

In each set of the above solutions, ($G^2+g_1^2+g_2^2$) is of the order of $k^2$. In a histogram plot on the probability of stochastic variables, let histogram bracket width be $\epsilon$ in each direction ($\epsilon \ll 1$), the joint probability for each of above solution points in the three-dimensional space is:

$$p_3 = \varepsilon^3 (2\pi)^{-3/2} \exp\left[-\frac{1}{2}(G^2 + g_1^2 + g_2^2)\right] \sim O\left(\varepsilon^3 \exp\left(-\frac{1}{2}k^2\right)\right). \tag{14}$$

Shortcomings of Known Statistical Models

As thus seen from the above, for each given corner point in FIG. 4, the above Monte Carlo statistical model can not uniquely determine the values of the underlying stochastic variables. Additionally, the probability of any above corner solution point is of the order of:

$O(\epsilon^3 \exp(-\frac{1}{2}k^2))$ which is much smaller than the probability $P_c$ in Equation (6).

Accordingly, there exists a need in the art to overcome the deficiencies and limitations described hereinabove.

SUMMARY OF THE INVENTION

In a first aspect of the invention, a method of modeling stochastic behavior of a system of N similar statistical variables using N uncorrelated/independent random model parameters. The method comprises providing a system of N similar statistical variables, wherein each stochastic variable has a same standard deviation. The method further includes partially correlating each and every pair of stochastic variables among N variables, wherein a degree of partial correlation is a same for all pairs of variables. A statistical model is constructed to represent a system of N stochastic variables in which only N independent stochastic model parameters are used. A one-to-one mapping relation exists between N model parameters and the N variables. The method further comprises finding unique values of the N model parameters given a set of values of the N variables. Reversely, the method also comprises finding the values of the N variables given a set of values of the N model parameters.

In another aspect of the invention, a method given one or more M corner conditions on some or all of N variables, where M is a positive integer, comprising: finding a set of optimal corner solutions for N model parameters; transferring the M corner conditions on N variables to the M corner conditions on N model parameters using an established one-to-one mapping relation between the N variables and N model parameters; and finding solutions for the N model parameters to satisfy the M corner conditions. When the number of corner conditions, M, equals the number of model parameters, N, a set of N linear algebraic equations uniquely determines the corner solutions for the M model parameters. When the number of M corner conditions is less than the number of N model parameters, there exist many sets of corner solutions for the N model parameters. An optimal set of corner solutions is found by maximizing a joint probability density under restriction of the M corner conditions which is equivalent to minimizing a square of the distance to an origin of the N-dimensional model parameter space under the M corner conditions. The square of the distance to the origin of the N-dimensional model parameter space is a sum of squares of the N model parameters. A model parameter that does not appear in any of the M corner conditions, the minimization set it to zero which reduces a number of model parameters from N to L, where L is a number of model parameters appearing in any corner condition. The found corner values of the N model parameters are used in a device ACV/mismatch model.

In another aspect of the invention, a method comprises a computer program product comprises a computer usable medium having readable program code embodied in the medium. The computer program product includes at least one component with the readable program code executable to perform modeling stochastic behavior of a system of N similar statistical variables using N uncorrelated/independent random model parameters which provides a one-to-one mapping relation between instance values and their representation.

DETAILED DESCRIPTION OF EMBODIMENTS OF THE INVENTION

Figure 1:
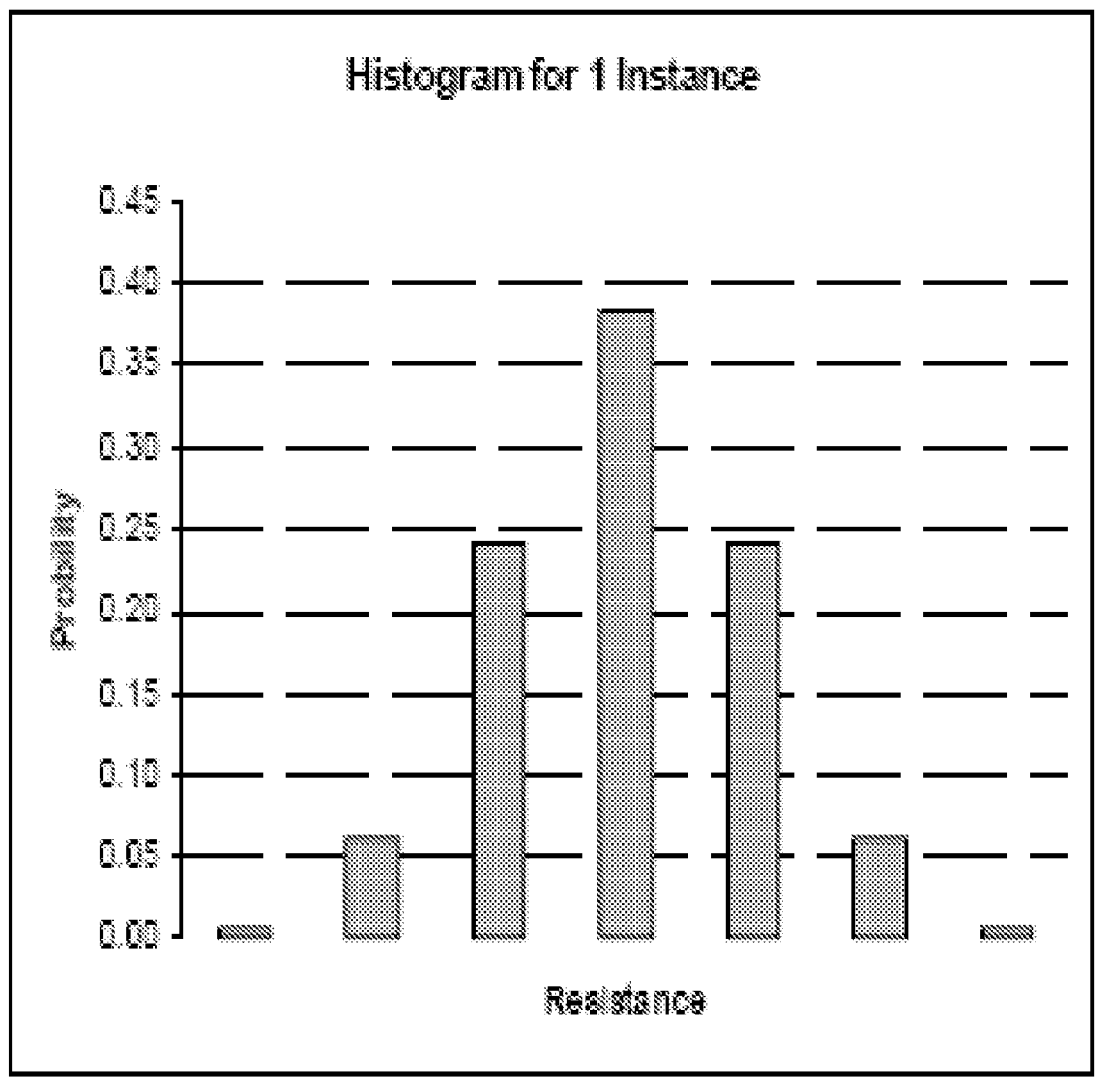
FIG. 1 shows measured total resistance values over many lots/wafers/chips or over a certain time period plotted in a histogram.
Figure 2:
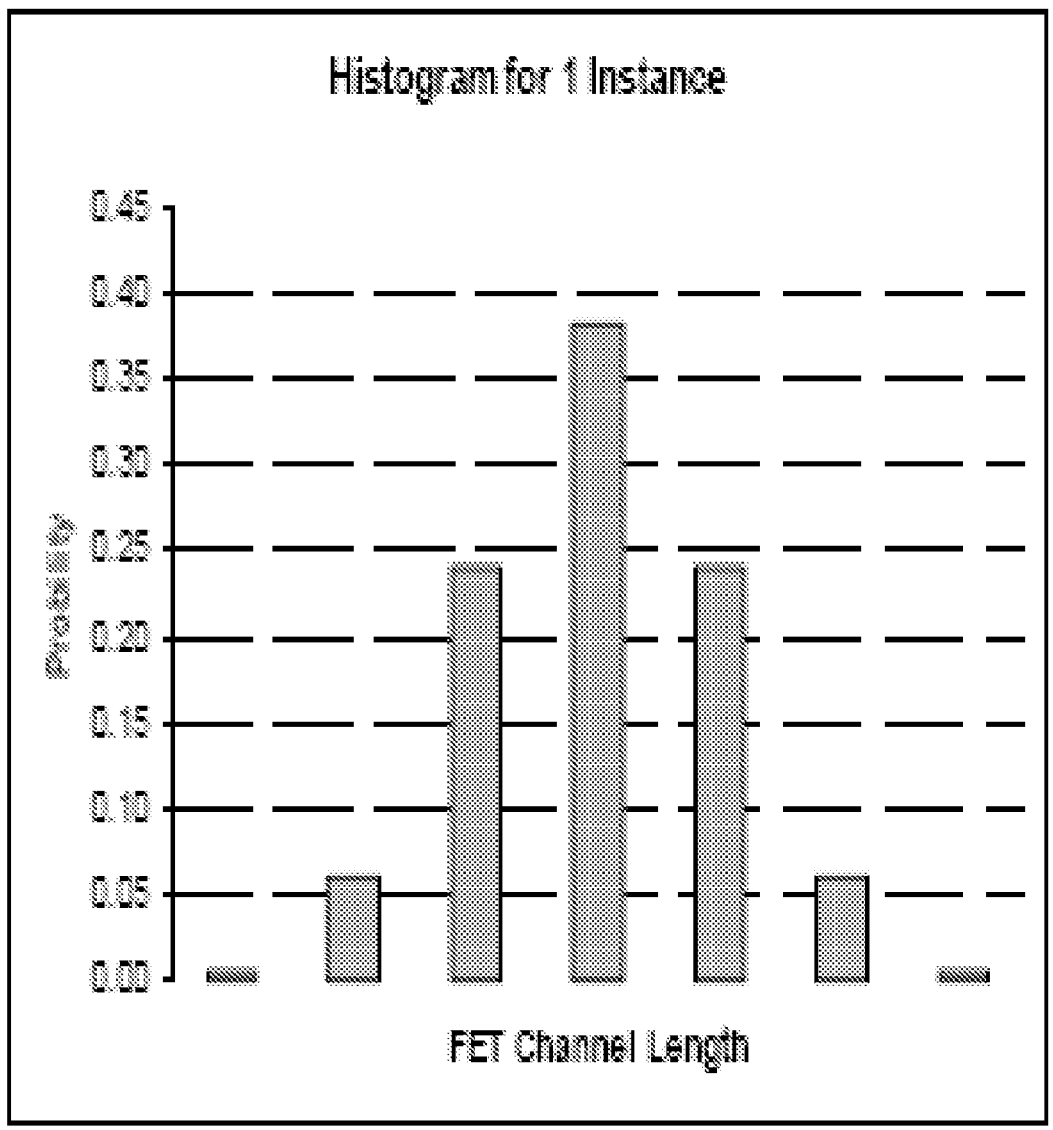
FIG. 2 shows a measured or typical channel length distribution plotted in a histogram.
Figure 3:
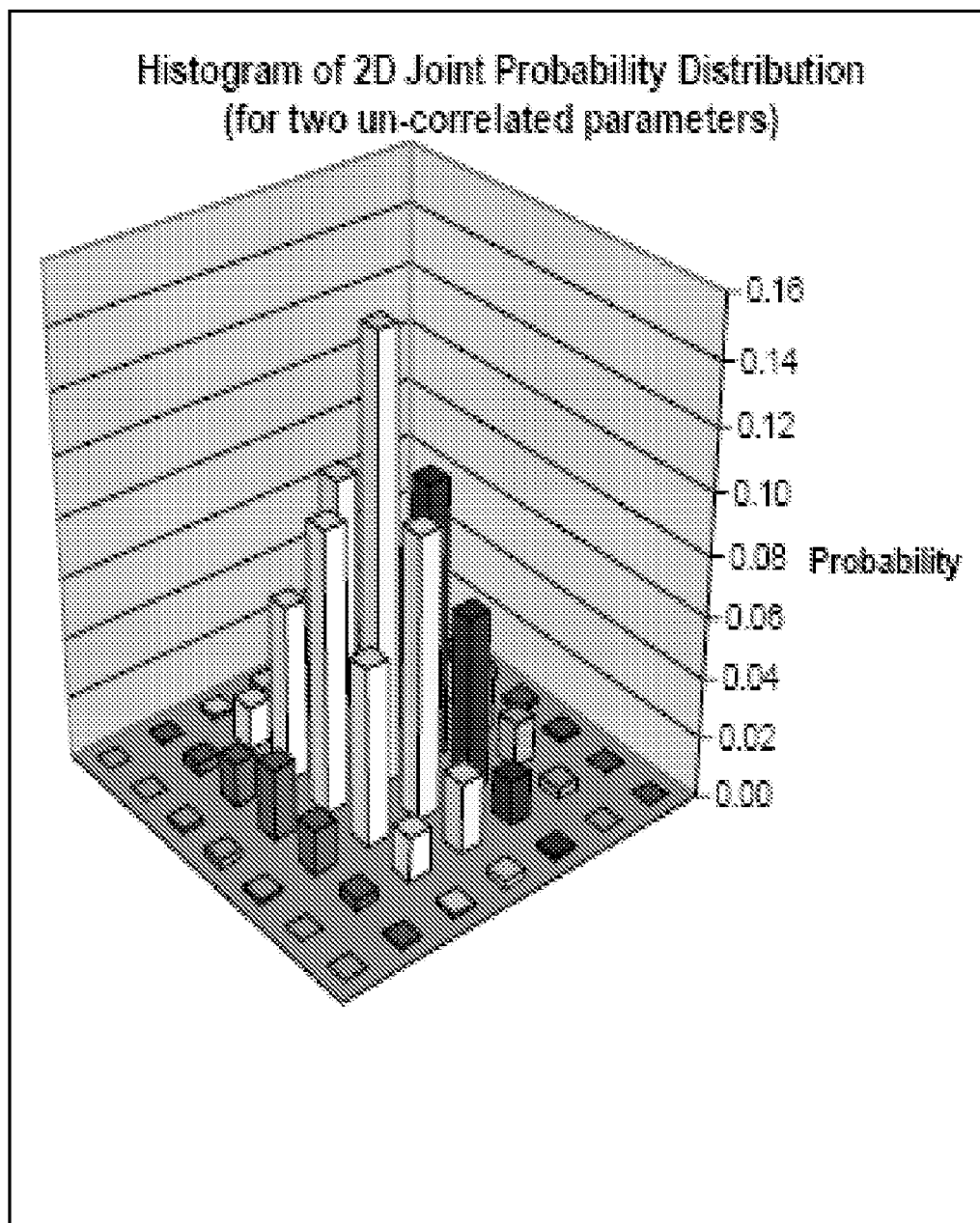
FIG. 3 shows a histogram plot of a two-dimensional joint probability distribution for two un-correlated parameters.

The invention generally relates to a system and method of modeling stochastic behavior of a system of N similar statistical variables using N uncorrelated/independent random model parameters, more particularly, it relates to a system and method for modeling semiconductor device across chip variations and device mismatch and for modeling macro models for VLSI logic delay circuits. By implementing the system and method of the invention, a statistical model provides a one-to-one mapping relation. In other words, by implementing the system and method of the invention it is now possible to obtain a one-to-one mapping relation between instance values and their representation. A Monte Carlo model is a typical implementation of statistical modeling in VLSI circuit simulations. In other words, a Monte Carlo model is a typical statistical model in VLSI circuit simulations and is used in Monte Carlo simulations of VLSI circuits. The most common Monte Carlo model is such a model in which each model parameter is represented by an independent Gaussian distribution. Another embodiment of a statistical model in VLSI circuit simulation is a corner model in which each of the N model parameters $g_1, g_2, \ldots, g_N$ is an independent skewing parameter for corner simulation of VLSI circuits.

In one exemplary illustration, the method of modeling stochastic behavior of a system of N similar statistical variables using N uncorrelated/independent random model parameters includes providing a system of N similar statistical variables/observables, which include various VLSI circuit examples, semiconductor device examples, semiconductor device model examples. Each and every stochastic variable of all the examples has the same standard deviation, which includes contributions from both correlated variations and uncorrelated variations. The method further includes partially correlating each and every pair of stochastic variables among N variables, where the degree of partial correlation (e.g., liner correlation coefficient) is the same for all pairs of variables. There are $N(N-1)/2$ such pairs among N variables. A mismatch problem or tracking problem in VLSI design, semiconductor device design and semiconductor device modeling, etc. is thus provided.

The method further includes constructing a statistical model to represent a system of N stochastic variables in which only N independent stochastic model parameters are used. The statistical model reproduces required one-body statistics and two-body statistics. The method further includes developing a one to one mapping relation between the N model parameters and the N observables. The method further includes finding unique values of the N model parameters given a set of values of the N variables. Reversely, the method also includes finding the values of the N variables given a set of values of the N model parameters.

The following is a statistical model for mismatch/ACV in accordance with the invention. The statistical model overcomes the two shortcomings of the known modeling. Specifically, the statistical model of the present invention will:

uniquely determine the values of N model parameters given the values of N stochastic variables, and increase the probability of corner solution to the order of $O(\epsilon^N)$ from the order of $O(\epsilon^{N+1})$, where $\epsilon$ is the size of histogram bar in a single direction.

The invention will provide an irreducible representation of N-instance statistical model for ACV/mismatch, where N is a positive integer and $N \geq 2$. The irreducible representation will provide a one-to-one mapping relation between instance values and their representation in statistical simulation space.

After the ACV/mismatch statistical model is built, implementing the invention is much easier (compared to conventional models) and transparent to locate/determine a corner point in statistical or Monte Carlo simulation space. Also, the corner has a higher joint probability than a corresponding corner from the conventional Monte Carlo/statistical model.

In accordance with the invention, irreducible representation for two instances is provided. The requirements can alternatively be satisfied by the following statistical model:

$$\sigma_{sym} = \sqrt{\sigma_s^2 + \frac{1}{2}\sigma_r^2}, \quad (16)$$

$$\sigma_{asym} = \sigma_r/\sqrt{2}.$$

In Equation (15), each of G and $g_2$ is an independent stochastic variable with a Gaussian distribution of zero mean and standard deviation of 1. Equation (15) contains only two independent stochastic variables, and thus is a set of stochastic functions defined in a two-dimensional space (see FIG. 5). Model (15) is more "compact" than model (equation) (4), and is more suitable to corner analysis of mismatch/ACV.

Figure 5:
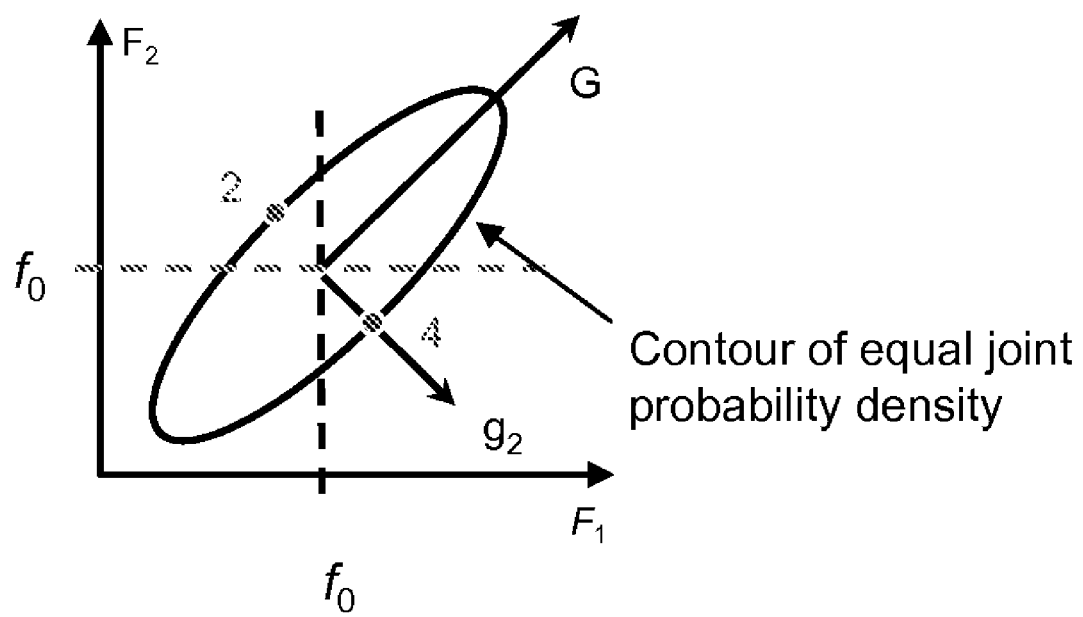
FIG. 5 is a schematic plot of mismatch between two instances $F_1$ and $F_2$ of a device/parameter in accordance with the invention.

FIG. 5 is a schematic plot of mismatch between two instances $F_1$ and $F_2$ of a device/parameter. Point 2 and point 4 are two points at which mismatch is largest (for a given joint probability density). G and $g_2$ are the axes of the principle components of the ellipse.

In an angular coordinate system, $$G = r\cos\varphi, \quad (17)$$
$$g_2 = r\sin\varphi,$$

Equation (15) becomes:

$$F_1 = f_0 + r(\sigma_{sym}\cos\varphi + \sigma_{asym}\sin\varphi), \quad (18)$$
$$F_2 = f_0 + r(\sigma_{sym}\cos\varphi - \sigma_{asym}\sin\varphi).$$

The joint probability density at location $(G, g_2)$ is:

$$P(G, g_2) = p(G)p(g_2) \quad (19)$$
$$= (2\pi)^{-1}\exp\left[-\frac{1}{2}(G^2 + g_2^2)\right]$$
$$= (2\pi)^{-1}\exp\left(-\frac{1}{2}r^2\right),$$

which is independent of angle $\varphi$. For a given probability density, $$p_0 = (2\pi)^{-1}\exp\left(-\frac{1}{2}r_0^2\right), \quad (20)$$

i.e., for a fixed radius $r_0$, the constant probability density curve is an ellipse. The ellipsoid is centered at $(F_1, F_2) = (f_0,$ $f_0)$, has a long axis in the 2D diagonal direction (1, 1), i.e., with an angle of $\phi = 45°$ (see FIG. 5). The long semi-axis of the ellipse is proportional to $r_0\sigma_{sym}$, and the short semi-axis of the ellipse is proportional to $r_0\sigma_{asym}$.

Figure 4:
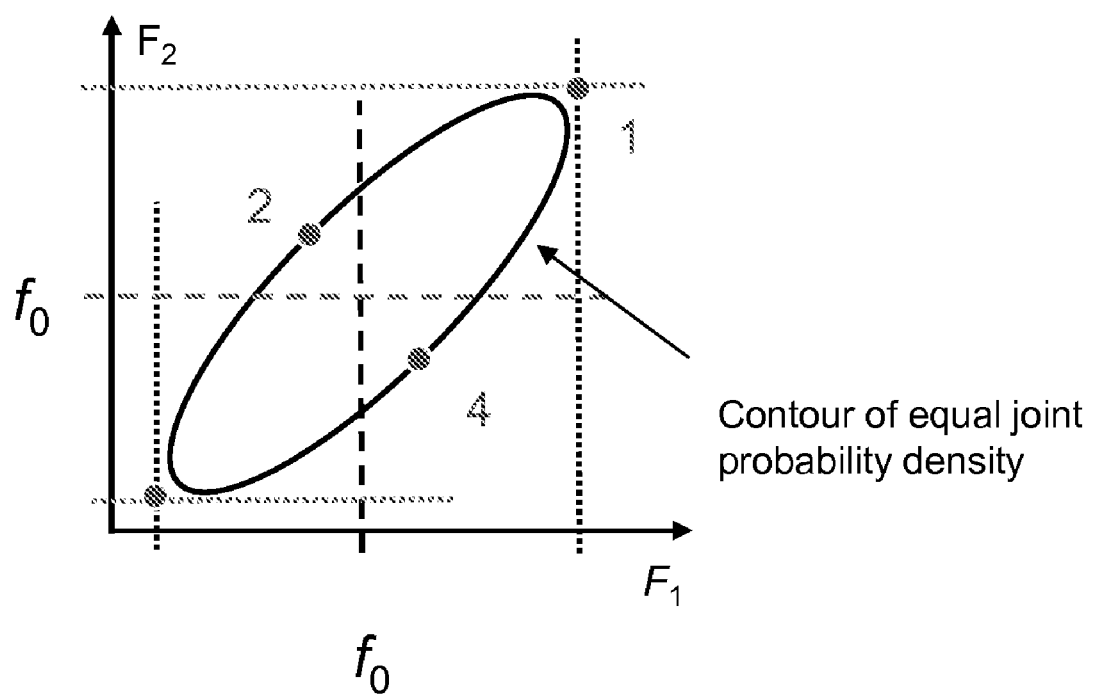
FIG. 4 is schematic plot of mismatch between two instances $F_1$ and $F_2$ of a device/parameter.

For a fast-fast or slow-slow corner (point 1 or 3 in FIG. 4), the k-σ corner point (k=1, 2, 3, etc.) is determined by two straight lines in the two-dimension space of $(G, g_2)$, $$\sigma_{sym}G + \sigma_{asym}g_2 = \pm k\sigma_F, \quad (21)$$
$$\sigma_{sym}G - \sigma_{asym}g_2 = \pm k\sigma_F.$$

The intersection of two straight lines (21) is a point, and that is the unique solution, $$G = \pm k\sigma_F/\sigma_{sym}, \; g_2 = 0. \quad (22)$$

The sum $(G^2 + g_2^2)$ is of the order $O(k^2)$.

For a mismatch corner (points 4 and 2 in FIGS. 4 and 5), the k-σ corner point (k=1, 2, 3, etc.) satisfies:

$$F_1 - F_2 = \pm k\sigma_m,$$
$$\frac{1}{2}(F_1 + F_2) = f_0.$$

Equivalently, these mean that:

$$F_1 = f_0 \pm \frac{1}{2}k\sigma_m,$$
$$F_2 = f_0 \mp \frac{1}{2}k\sigma_m,$$

namely, $$\sigma_{sym}G + \sigma_{asym}g_2 = \pm\frac{1}{2}k\sigma_m \quad (23)$$
$$\sigma_{sym}G - \sigma_{asym}g_2 = \mp\frac{1}{2}k\sigma_m.$$

Here, Equation (23) describes two straight lines in 2D space $(G, g_2)$, and their intersection is a single point, i.e., the unique mismatch corner solution, $$G = 0, \; g_2 = \pm k. \quad (24)$$

The sum $(G^2 + g_2^2)$ is equal to $k^2$. The probability for the above found points in the two-dimensional space is $$P_2 = \varepsilon^2(2\pi)^{-1}\exp\left[-\frac{1}{2}(G^2 + g_2^2)\right] \approx O\left(\varepsilon^2\exp\left(-\frac{1}{2}k^2\right)\right), \quad (25)$$

where $\varepsilon$ is the bracket width in one direction, $\varepsilon \ll 1$. $P_2$ in equation (25) is much larger than $p_3$ in equation (14).

At a given $r_0$, the smallest mismatch $F_1 - F_2 = 0$ occurs at $\phi = 0$ or $\pi$. In this case, both instances have the same value, $$F_i = f_0 \pm r_0\sigma_{sym} \; i = 1, 2.$$

Irreducible Representation of Three Instances

Requirements for three-instance case are given previously in Equations (2) and (3). In the modeling of the present invention, the statistical model for 3-instance case is given by $$F_1 = f_0 + \sigma_{sym}G + \sigma_r\left(\frac{1}{\sqrt{2}}g_2 + \frac{1}{\sqrt{6}}g_3\right),\quad (26a)$$

$$F_2 = f_0 + \sigma_{sym}G + \sigma_r\left(-\frac{1}{\sqrt{2}}g_2 + \frac{1}{\sqrt{6}}g_3\right),\quad (26b)$$

$$F_3 = f_0 + \sigma_{sym}G + \sigma_r\left(0 - \frac{2}{\sqrt{6}}g_3\right),\quad (26c)$$

with $$\sigma_{sym} = \sqrt{\sigma_s^2 + \frac{1}{3}\sigma_r^2}.\quad (27)$$

In Equations (26), each of G, $g_2$, and $g_3$ is an independent stochastic variable with a Gaussian distribution of zero mean and standard deviation of 1. Equation (26) contains three independent statistical variables, and thus is a set of stochastic functions defined in a three-dimensional space.

In a spherical coordinate system ($0 \leq \theta \leq \pi$, $0 \leq \phi \leq 2\pi$), $$G = r\cos\theta,\quad (28)$$
$$g_2 = r\sin\theta\cos\varphi,$$
$$g_3 = r\sin\theta\sin\varphi,$$

Equation (26) becomes:

$$F_1 = f_0 + r\left[\sigma_{sym}\cos\theta + \sigma_r\left(\frac{1}{\sqrt{2}}\cos\varphi + \frac{1}{\sqrt{6}}\sin\varphi\right)\sin\theta\right],\quad (29)$$

$$F_2 = f_0 + r\left[\sigma_{sym}\cos\theta + \sigma_r\left(-\frac{1}{\sqrt{2}}\cos\varphi + \frac{1}{\sqrt{6}}\sin\varphi\right)\sin\theta\right],$$

$$F_3 = f_0 + r\left[\sigma_{sym}\cos\theta - \frac{2}{\sqrt{6}}\sigma_r\sin\varphi\sin\theta\right].$$

Notice that the average of 3 instances is independent of stochastic variables $g_2$ and $g_3$. In the spherical coordinate system, the average is independent of the angle $\phi$, $$\frac{1}{3}(F_1 + F_2 + F_3) = f_0 + \sigma_{sym}G = f_0 + r\sigma_{sym}\cos\theta.$$

The joint probability density at location (G, $g_2$, $g_3$) is:

$$P = p(G)p(g_2)p(g_3)\quad (30)$$
$$= (2\pi)^{-3/2}\exp\left[-\frac{1}{2}(G^2 + g_2^2 + g_3^2)\right]$$
$$= (2\pi)^{-3/2}\exp\left(-\frac{1}{2}r^2\right),$$

which is independent of angles $\theta$ and $\phi$. For a given probability density, $$P_0 = (2\pi)^{-3/2}\exp\left(-\frac{1}{2}r_0^2\right),\quad (31)$$

i.e., for a fixed radius $r_0$, the constant probability density surface is an ellipsoid. The ellipsoid is centered at ($F_1$, $F_2$, $F_3$)=($f_0$, $f_0$, $f_0$), and its long axis is in the 3D diagonal direction of (1, 1, 1).

At a given probability density $P_0$, i.e., at a given $r_0$, the differences (i.e., mismatch) between two stochastic variables are:

$$F_1 - F_2 = \sigma_m g_2 = r_0\sigma_m\sin\theta\cos\phi,\quad (32a)$$

$$F_{1,2} - F_3 = \sigma_m\left(\pm\frac{1}{2}g_2 + \frac{\sqrt{3}}{2}g_3\right)\quad (32b)$$
$$= r_0\sigma_m\left(\pm\frac{1}{2}\cos\varphi + \frac{\sqrt{3}}{2}\sin\varphi\right)\sin\theta.$$

The largest magnitude of mismatch occurs at $\theta=\frac{1}{2}\pi$, i.e., at G=0. In such a case, the mismatch among 3 instances becomes:

$$F_1 - F_2 = r_0\sigma_m\cos\varphi,\quad \text{when } G = 0,\quad (33)$$

$$F_{1,2} - F_3 = \pm r_0\sigma_m\cos\left(\varphi \mp \frac{1}{3}\pi\right),\quad \text{when } G = 0.$$

The maximum absolute value of mismatch between instances 1 and 2 occurs at $\phi=0°$ or $180°$, $$|F_1 - F_2| = r_0\sigma_m,\text{ when } G=0, \phi=0 \text{ or } \pi.\quad (34a)$$

At these two locations, $$F_1 = f_0 \pm \frac{1}{2}r_0\sigma_m,\quad (34b)$$

$$F_2 = f_0 \mp \frac{1}{2}r_0\sigma_m,$$

$$F_3 = f_0.$$

The maximum absolute value of mismatch between instances 1 and 3 occurs at $\phi=60°$ or $240°$, when $$G=0, \phi=\pi/3 \text{ or } 4\pi/3.\quad (35a)$$

At this time, $$F_1 = f_0 \pm \frac{1}{2}r_0\sigma_m,\quad (35b)$$

$$F_2 = f_0,$$

$$F_3 = f_0 \mp \frac{1}{2}r_0\sigma_m.$$

The maximum absolute value of mismatch between instances 2 and 3 occurs at $\phi=120°$ or $300°$, $$|F_2 - F_3| = r_0\sigma_m,\text{ when } G=0, \phi=2\pi/3 \text{ or } 5\pi/3.\quad (36a)$$

Correspondingly, three variables have these values:

$$F_1 = f_0,$$

$$F_2 = f_0 \pm \frac{1}{2} r_0 \sigma_m, \qquad (36b)$$

$$F_3 = f_0 \mp \frac{1}{2} r_0 \sigma_m.$$

Corner case (i). It is possible to find a corner point of k-σ mismatch between instances 1 and 2, $$|F_1 - F_2| = k\sigma_m, \qquad (37)$$

symmetrically placed around the nominal value:

$$\frac{1}{2}(F_1 + F_2) = f_0. \qquad (38)$$

These are equivalent to:

$$F_1 = f_0 \pm \frac{1}{2} k\sigma_m, \qquad (39)$$

$$F_2 = f_0 \mp \frac{1}{2} k\sigma_m.$$

Corresponding solutions have been found above. That is, $$r = k, \qquad (40)$$

$$\theta = \frac{1}{2}\pi, \varphi = 0 \text{ or } \pi. \qquad (41)$$

The joint probability density P is found to be:

$$P = (2\pi)^{-3/2} \exp\left(-\frac{1}{2}k^2\right). \qquad (42)$$

Corner case (ii). We find a corner point which is a k-σ mismatch point between instances 1 and 2, $$|F_1 - F_2| = k\sigma_m, \qquad (37)$$

and also has a joint probability density $$P = (2\pi)^{-3/2} \exp\left(-\frac{1}{2}k^2\right). \qquad (42)$$

According to Equation (31), we first find that $$r = k. \qquad (40)$$

Then, using Equation (33), we get that $$\theta = \pm \frac{1}{2}\pi, \varphi = 0 \text{ or } \pi. \qquad (41)$$

The solution is the same as that found above in corner case (i).

Corner case (iii). It is possible to find a corner point which is a k-σ mismatch point between instances 1 and 2, $$|F_1 - F_2| = k\sigma_m, \qquad (37)$$

and also to maximize the joint probability density, i.e., to minimize (the square of) its distance to the center $$r^2 = G^2 + g_2^2 + g_3^2.$$

Using Equation (32a), we first minimize $(G^2 + g_3^2)$, i.e., we set $G = g_3 = 0$. The second thing is to realize that $g_2 = k$. Namely, $$F_1 = f_0 \pm \frac{1}{2} k\sigma_m, \qquad (39)$$

$$F_2 = f_0 \mp \frac{1}{2} k\sigma_m,$$

This is the same solution as that was found above.

At a given $r_0$, the smallest mismatch $F_i - F_j = 0$ occurs at $\theta = 0$ or $\pi$. In this case, all instances have the same value, $$F_i = f_0 \pm r_0 \sigma_{sym} \quad i = 1, 2, 3.$$

It is noted that the right hand side of Equation (26a-c) can be exchanged. For example, the following are equivalent model form, $$F_1 = f_0 + \sigma_{sym} G + \sigma_r \left(-\frac{1}{\sqrt{2}} g_2 + \frac{1}{\sqrt{6}} g_3\right),$$

$$F_2 = f_0 + \sigma_{sym} G + \sigma_r \left(0 - \frac{2}{\sqrt{6}} g_3\right),$$

$$F_3 = f_0 + \sigma_{sym} G + \sigma_r \left(\frac{1}{\sqrt{2}} g_2 + \frac{1}{\sqrt{6}} g_3\right).$$

Irreducible Representation of Four Instances

Requirements for three-instance case are given previously in Equations (2) and (3). The modeling according to the present invention can include a statistical model for 4-instance case. This can be written as follows:

$$\begin{pmatrix} F_1 \\ F_2 \\ F_3 \\ F_4 \end{pmatrix} = f_0 \begin{pmatrix} 1 \\ 1 \\ 1 \\ 1 \end{pmatrix} + U_{4\times 4} \begin{pmatrix} 2\sigma_{sym} G \\ \sigma_r g_2 \\ \sigma_r g_3 \\ \sigma_r g_4 \end{pmatrix}, \qquad (43)$$

where $$\sigma_{sym} = \sqrt{\sigma_s^2 + \frac{1}{4}\sigma_r^2}. \qquad (44)$$

$U_{4\times 4}$ is a 4-by-4 normalized orthogonal matrix, $$U_{4\times 4} = \begin{pmatrix} \frac{1}{2} & \frac{1}{\sqrt{2}} & \frac{1}{\sqrt{6}} & \frac{1}{\sqrt{12}} \\ \frac{1}{2} & -\frac{1}{\sqrt{2}} & \frac{1}{\sqrt{6}} & \frac{1}{\sqrt{12}} \\ \frac{1}{2} & 0 & -\frac{2}{\sqrt{6}} & \frac{1}{\sqrt{12}} \\ \frac{1}{2} & 0 & 0 & -\frac{3}{\sqrt{12}} \end{pmatrix}, \quad (45)$$

with the property of $$U_{4\times 4}{}^T U_{4\times 4} = I_{4\times 4}.$$

Here, $I_{4\times 4}$ is the 4×4 unit matrix.

Equation (43) contains four independent stochastic variables, and thus is a set of stochastic functions defined in a four-dimensional space. Notice that the average of all 4 instances is independent of stochastic variables $g_2$, $g_3$, and $g_4$, $$\frac{1}{4}(F_1 + F_2 + F_3 + F_4) = f_0 + \sigma_{sym} G.$$

The joint probability density at location $(G, g_2, g_3, g_4)$ is:

$$P(G, g_2, g_3, g_4) = p(G)p(g_2)p(g_3)p(g_4) \quad (46)$$

$$= (2\pi)^{-2} \exp\left[-\frac{1}{2}(G^2 + g_2^2 + g_3^2 + g_4^2)\right],$$

which only depends on its distance to the origin of the four-dimensional space. The differences (i.e., mismatch) between two stochastic variables are given by Equation (32), and the following additional cases involving the fourth instance, $$F_{1,2} - F_4 = \sigma_m\left(\pm\frac{1}{2}g_2 + \frac{1}{2\sqrt{3}}g_3 + \sqrt{\frac{2}{3}}g_4\right), \quad (47a)$$

$$F_3 - F_4 = \sigma_m\left(-\frac{1}{\sqrt{3}}g_3 + \sqrt{\frac{2}{3}}g_4\right). \quad (47b)$$

Corner case (i). We find a corner point which is a k-σ mismatch point between instances 1 and 2, $$|F_1 - F_2| = k\sigma_m, \quad (37)$$

and also maximizes the joint probability density, i.e., also minimizes (the square of) its distance to the origin, $$r^2 = G^2 + g_2^2 + g_3^2 + g_4^2.$$

Using Equation (32a), it is possible to minimize $(G^2 + g_3^2 + g_4^2)$, i.e., to set $G = g_3 = g_4 = 0$. The second thing is to realize that $g_2 = \pm k$. Correspondingly, the instance variables have the following corner values, $$F_1 = f_0 \pm \frac{1}{2}k\sigma_m, \quad (48)$$

$$F_2 = f_0 \mp \frac{1}{2}k\sigma_m,$$

$$F_3 = F_4 = f_0.$$

Corner case (ii). We find a corner point which is a k-σ mismatch point between instances 1 and 3, $$|F_1 - F_3| = k\sigma_m.$$

There are several unknown variables but there is only one Equation (32b). The optimal solution leads to the largest joint probability density among all solutions. Equivalently, this means to minimize (the square of) its distance to the origin, $$r^2 = G^2 + g_2^2 + g_3^2 + g_4^2.$$

Since $|F_1 - F_3|$ is independent of G and $g_4$, it is possible to minimize $(G^2 + g_4^2)$, i.e., to set $G = g_4 = 0$. Then, we find other model parameters, $$g_2 = \pm\frac{1}{2}k,$$

$$g_3 = \pm\frac{\sqrt{3}}{2}k.$$

Correspondingly, the 4 variables have the following corner values $$F_2 = F_4 = f_0,$$

$$F_1 = f_0 \pm \frac{1}{2}k\sigma_m,$$

$$F_3 = f_0 \mp \frac{1}{2}k\sigma_m.$$

Corner case (iii). We find a corner point which is a k-σ mismatch point between instances 3 and 4, $$|F_3 - F_4| = k\sigma_m.$$

There are several unknown variables but there is only one Equation (47b). The optimal solution, however, leads to the largest joint probability density among all solutions. Equivalently, this means to minimize (the square of) its distance to the center $$r^2 = G^2 + g_2^2 + g_3^2 + g_4^2.$$

Using Equation (47b), it is possible to minimize $(G^2 + g_2^2)$, i.e., to set $G = g_2 = 0$. Then, we find the corner values of other model parameters, $$g_3 = \mp\frac{1}{\sqrt{3}}k,$$

$$g_4 = \pm\sqrt{\frac{2}{3}}k.$$

Correspondingly, the 4 variables have values $$F_1 = F_2 = f_0,$$
$$F_3 = f_0 \pm \frac{1}{2}k\sigma_m,$$
$$F_4 = f_0 \mp \frac{1}{2}k\sigma_m.$$

Corner case (iv). We find a corner point which is a k-σ mismatch point between instances 1 and 2 and is also a k-σ mismatch point between 3 and 4 simultaneously, $$|F_1 - F_2| = k\sigma_m, \tag{37}$$
$$|F_3 - F_4| = k\sigma_m.$$

There are two linear equations and three variables $g_2$, $g_3$, and $g_4$. The number of solutions is infinite. The optimal solution which maximizes the joint probability density is:

$$g_2 = \pm k, \tag{49}$$
$$g_3 = \mp \frac{1}{\sqrt{3}} k,$$
$$g_4 = \pm \sqrt{\frac{2}{3}} k.$$

Correspondingly, the four variables have the following corner values,—

$$F_1 = f_0 \pm \frac{1}{2}k\sigma_m, \tag{50}$$
$$F_2 = f_0 \mp \frac{1}{2}k\sigma_m,$$
$$F_3 = f_0 \pm \frac{1}{2}k\sigma_m,$$
$$F_4 = f_0 \mp \frac{1}{2}k\sigma_m.$$

Irreducible Representation for N Instance

Requirements for the general case of N instances are given previously in Equations (2) and (3). In accordance with the modeling of the invention, the statistical model for N instances can be written in a matrix format, $$\begin{pmatrix} F_1 \\ F_2 \\ F_3 \\ \vdots \\ F_N \end{pmatrix} = f_0 \begin{pmatrix} 1 \\ 1 \\ 1 \\ \vdots \\ 1 \end{pmatrix} + U_{N \times N} \begin{pmatrix} \sqrt{N}\,\sigma_{sym} g_1 \\ \sigma_r g_2 \\ \sigma_r g_3 \\ \vdots \\ \sigma_r g_N \end{pmatrix}, \tag{51}$$

where $$\sigma_{sym} = \sqrt{\sigma_s^2 + \sigma_r^2/N}, \tag{52}$$

$U_{N \times N}$ is an N-by-N normal-orthogonal matrix, $$U_{N \times N} = [U_{ij}]_{N \times N} \tag{53}$$

$$= \begin{pmatrix} \frac{1}{\sqrt{N}} & \frac{1}{\sqrt{2 \cdot 1}} & \frac{1}{\sqrt{3 \cdot 2}} & \cdots & \frac{1}{\sqrt{N(N-1)}} \\ \frac{1}{\sqrt{N}} & -\frac{2-1}{\sqrt{2 \cdot 1}} & \frac{1}{\sqrt{3 \cdot 2}} & \cdots & \frac{1}{\sqrt{N(N-1)}} \\ \frac{1}{\sqrt{N}} & 0 & -\frac{3-1}{\sqrt{3 \cdot 2}} & \cdots & \frac{1}{\sqrt{N(N-1)}} \\ \vdots & \vdots & \vdots & \ddots & \vdots \\ \frac{1}{\sqrt{N}} & 0 & 0 & \cdots & -\frac{1}{\sqrt{N(N-1)}} \end{pmatrix},$$

with the property $$U_{N \times N}^T U_{N \times N} = I_{N \times N}. \tag{54}$$

Here $I_{N \times N}$ is an N×N unit matrix. More explicitly, the elements of the matrix $U_{N \times N}$ are:

$$U_{i1} = 1/\sqrt{N}, \tag{55}$$
$$i = 1, 2, \ldots, N;$$
$$U_{jj} = -\frac{j-1}{\sqrt{j(j-1)}},$$
$$j = 2, 3, \ldots, N;$$
$$U_{ij} = 0,$$
$$j = 2, 3, \ldots, N,$$
$$i > j;$$
$$U_{ij} = \frac{1}{\sqrt{j(j-1)}},$$
$$j = 2, 3, \ldots, N,$$
$$i < j.$$

Elements $U_{ij}$ have the following properties:

$$\sum_{i=1}^{N} U_{i1} = \sqrt{N}, \tag{56}$$
$$\sum_{i=1}^{N} U_{ij} = 0,$$
$$j = 2, 3, \ldots, N.$$

It should be noted that the rows of matrix $U_{N \times N}$ can be exchanged and/or rearranged. Equation (51) contains N independent stochastic variables, and thus is a set of stochastic functions defined in an N-dimensional space. The average of all N instances is independent of the last (N−1) stochastic variables $$\frac{1}{N} \sum_{i=1}^{N} F_i = f_0 + \sigma_{sym} g_1.$$

Given a set of values of N variables $F_1, \ldots, F_N$, the values of N model parameters $g_1, \ldots, g_N$ are uniquely determined through the following relation $$\begin{pmatrix} g_1 \\ g_2 \\ g_3 \\ \vdots \\ g_N \end{pmatrix} = \frac{1}{\sigma_r} \begin{pmatrix} \sigma_r/(\sqrt{N}\sigma_{sym}) & 0 & 0 & \cdots & 0 \\ 0 & 1 & 0 & \cdots & 0 \\ 0 & 0 & 1 & & 0 \\ \vdots & \vdots & \vdots & \ddots & \vdots \\ 0 & 0 & 0 & \cdots & 1 \end{pmatrix} U_{N \times N}^T \begin{pmatrix} F_1 - f_0 \\ F_2 - f_0 \\ F_3 - f_0 \\ \vdots \\ F_N - f_0 \end{pmatrix}, \quad (57)$$

where $U_{N \times N}^T$ is the transpose of the matrix $U_{N \times N}$.

The joint probability density at location $(g_1, g_2, \ldots, g_N)$ is:

$$p(g_1, g_2, \ldots, g_N) = \prod_{i=1}^{N} p(g_i) = (2\pi)^{-N/2} \exp\left(-\frac{1}{2}\sum_{i=1}^{N} g_i^2\right), \quad (58)$$

which only depends on its distance to the origin of the N-dimensional space. The difference (i.e., mismatch) between first two stochastic variables is the same as that given in Equation (32a).

Corner case (i). We find a corner point which is a k-σ mismatch point between instances 1 and 2, $$|F_1 - F_2| = k\sigma_m. \quad (37)$$

There is one equation, but many variables. The number of solutions is infinite. The optimal solution is the one which maximizes the joint probability density. Namely, to minimize (the square of) its distance to the origin, $$r^2 = \sum_{i=1}^{N} g_i^2.$$

Using Equation (33), it is possible to minimize $$\sum_{i=1, i \neq 2}^{N} g_i^2,$$

i.e., to set $$g_i = 0, i = 1, 3, 4, \ldots, N.$$

The second thing is to realize that $g_2 = k$. Thus, we have found the corner values of all statistical model parameters. The corresponding corner values of N variables are $$F_1 = f_0 \pm \frac{1}{2}k\sigma_m, \quad (59)$$

$$F_2 = f_0 \mp \frac{1}{2}k\sigma_m,$$

$$F_3 = F_4 = \ldots = F_N = f_0.$$

Corner case (ii). To find a corner point which is a k-σ mismatch point between instances (N−1) and N, $$|F_{N-1} - F_N| = k\sigma_m. \quad (60)$$

Also, there is one equation, and many variables. The optimal solution is the one which maximizes the joint probability density. Namely, it is possible to minimize (the square of) its distance to the origin, $$r^2 = \sum_{i=1}^{N} g_i^2.$$

Since, $$F_{N-1} - F_N = \sigma_m\left(-g_3\sqrt{\frac{N-2}{2(N-1)}} + g_4\sqrt{\frac{N}{2(N-1)}}\right). \quad (61)$$

the first thing is to minimize $$\sum_{i=1}^{N-2} g_i^2,$$

i.e., to set $$g_i = 0, i = 1, 2, 3, \ldots, N-2. \quad (62a)$$

Next, we get the optimal corner values of the rest two model parameters, $$g_{N-1} = \mp k\sqrt{\frac{N-2}{2(N-1)}}, \quad (62b)$$

$$g_N = \pm k\sqrt{\frac{N}{2(N-1)}}.$$

Now, we have found the corner values of all statistical model parameters. The corresponding corner values of N statistical variables are $$F_1 = F_2 = \ldots = F_{N-2} = f_0, \quad (63)$$

$$F_{N-1} = f_0 \pm \frac{1}{2}k\sigma_m,$$

$$F_N = f_0 \mp \frac{1}{2}k\sigma_m.$$

Corner case (iii). We find a corner point which is a k-σ mismatch point between instances i and j, $$|F_i - F_j| = k\sigma_m. \quad (64)$$

Again, there is one equation, and many variables. The number of solutions is infinite. The optimal solution is the one which maximizes the joint probability density. Namely, it is possible to minimize (the square of) its distance to the origin, $$r^2 = \sum_{i=1}^{N} g_i^2.$$

We also get the corner values of $i^{th}$ and $j^{th}$ variables, $$F_i = f_0 \pm \frac{1}{2}k\sigma_m, \quad (65)$$

$$F_j = f_0 \mp \frac{1}{2}k\sigma_m,$$

and all other $F_l = f_0$, $l = 1, 2, \ldots, N$, $l \neq i$, $l \neq j$.

Corner case (iv). When N is an even number, it is possible to find a corner point which is a k-σ mismatch point between instances 1 and 2, a k-σ mismatch point between instances 3 and 4, ..., and a k-σ mismatch point between instances (N−1) and N simultaneously.

$$|F_1 - F_2| = k\sigma_m, \quad (66)$$
$$|F_3 - F_4| = k\sigma_m,$$
$$\ldots$$
$$|F_{N-1} - F_N| = k\sigma_m.$$

There are N/2 equations, and N variables. The numbers of solution are infinite. The optimal solution is the one which maximizes the joint probability density. Namely, we want to minimize (the square of) its distance to the origin, $$r^2 = \sum_{i=1}^{N} g_i^2.$$

The corner values of the N model parameters are found to be:

$$g_1 = 0, \quad (67)$$
$$g_2 = \pm k,$$
$$g_3 = \mp \frac{1}{\sqrt{3}}k,$$
$$g_4 = \pm \sqrt{\frac{2}{3}}k,$$
$$\ldots$$
$$g_{N-1} = \mp k\sqrt{\frac{N-2}{2(N-1)}},$$
$$g_N = \pm k\sqrt{\frac{N}{2(N-1)}}.$$

The corresponding corner values of the N variables are found by substituting the corner values of the N model parameters in equation (67) into equation (51), $$F_1 = f_0 \pm \frac{1}{2}k\sigma_m, \quad (68)$$
$$F_2 = f_0 \mp \frac{1}{2}k\sigma_m,$$
$$F_3 = f_0 \pm \frac{1}{2}k\sigma_m,$$
$$F_4 = f_0 \mp \frac{1}{2}k\sigma_m,$$

-continued $$\ldots$$
$$F_{N-1} = f_0 \pm \frac{1}{2}k\sigma_m,$$
$$F_N = f_0 \mp \frac{1}{2}k\sigma_m.$$

Corner case (v). When N is an odd number, it is possible to find a corner point which is a k-σ mismatch point between instances 1 and 2, a k-σ mismatch point between instances 3 and 4, ..., and a k-σ mismatch point between instances (N−2) and (N−1) simultaneously.

$$|F_1 - F_2| = k\sigma_m, \quad (69)$$
$$|F_3 - F_4| = k\sigma_m,$$
$$\ldots$$
$$|F_{N-2} - F_{N-1}| = k\sigma_m.$$

There are (N−1)/2 equations but N variables. The optimal solution is the one which maximizes the joint probability density. Namely, it is possible to minimize (the square of) its distance to the origin, $$r^2 = \sum_{i=1}^{N} g_i^2.$$

The corner values of the N stochastic model parameters are found to be:

$$g_1 = 0, \quad (70)$$
$$g_2 = \pm k,$$
$$g_3 = \mp \frac{1}{\sqrt{3}}k,$$
$$g_4 = \pm \sqrt{\frac{2}{3}}k,$$
$$\ldots$$
$$g_{N-2} = \mp k\sqrt{\frac{N-3}{2(N-2)}},$$
$$g_{N-1} = \pm k\sqrt{\frac{N-1}{2(N-2)}},$$
$$g_N = 0.$$

The corresponding corner values of N statistical variables are found by substituting equation (70) into equation (51), $$F_1 = f_0 \pm \frac{1}{2}k\sigma_m, \quad (71)$$
$$F_2 = f_0 \mp \frac{1}{2}k\sigma_m,$$
$$F_3 = f_0 \pm \frac{1}{2}k\sigma_m,$$
$$F_4 = f_0 \mp \frac{1}{2}k\sigma_m,$$

-continued $$F_{N-2} = f_0 \pm \frac{1}{2}k\sigma_m,$$

$$F_{N-1} = f_0 \mp \frac{1}{2}k\sigma_m,$$

$$F_N = f_0.$$

SYSTEM ENVIRONMENT

Figure 6:
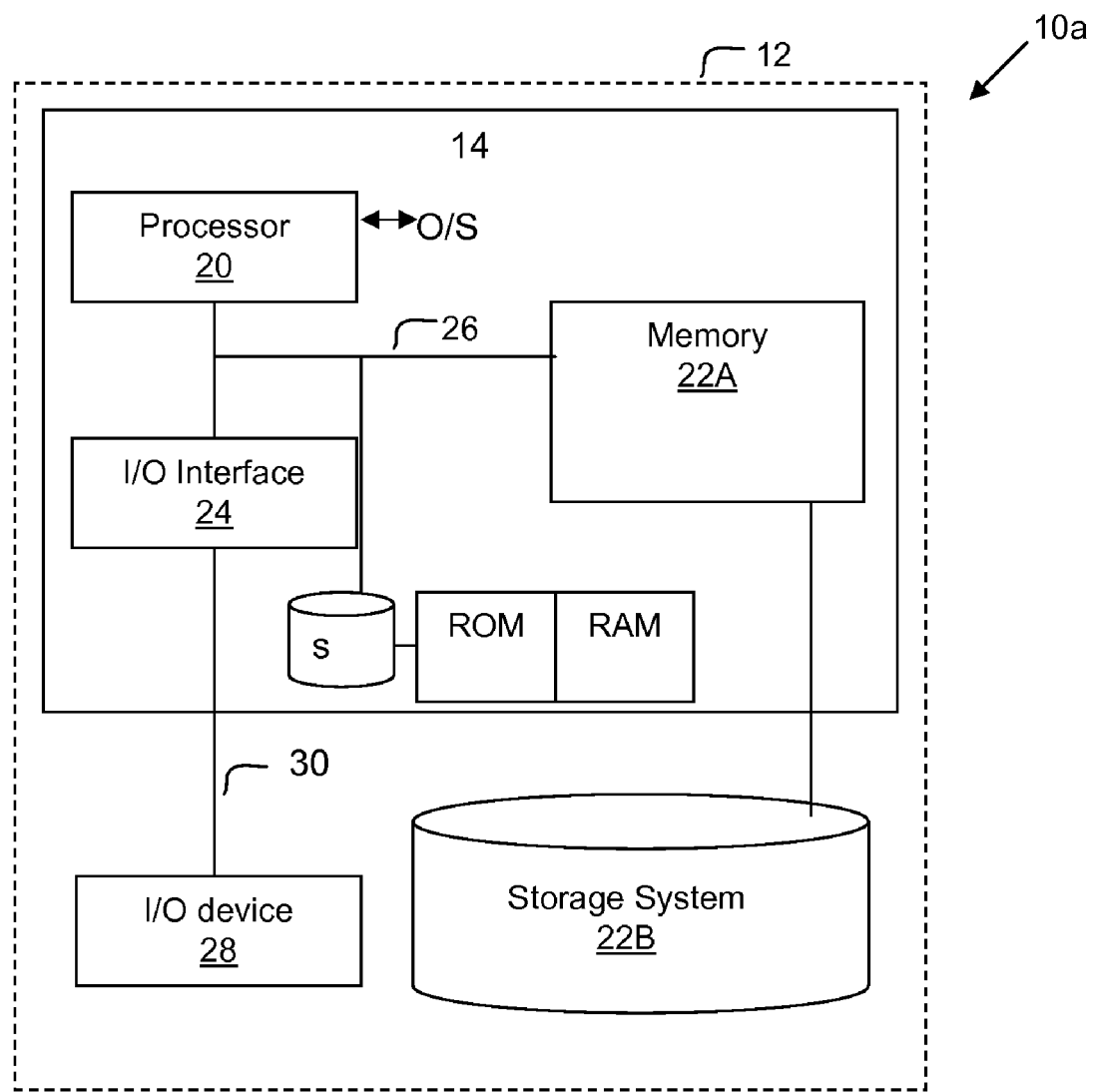
FIG. 6 shows an illustrative environment for managing the processes in accordance with the invention.

FIG. 6 shows an illustrative environment 10 for managing the processes in accordance with the invention. The illustrative environment may represent a user workstation 20. To this extent, the environment 10 includes a computer infrastructure 12 that can perform the processes described herein. In particular, the computer infrastructure 12 includes a computing device 14, which makes computing device 14 operable to perform the modeling in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 6 as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 7:
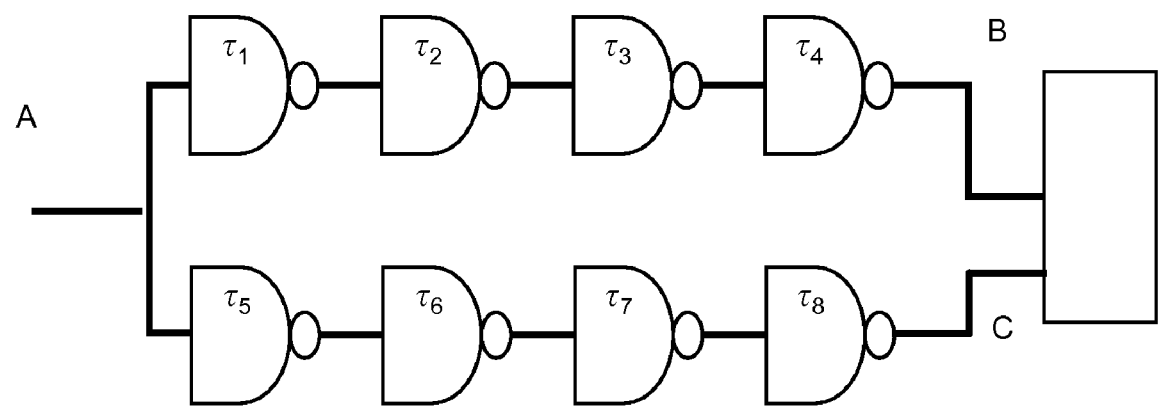
FIG. 7 shows a logic circuit which can be used in implementing the invention.

As should be understood by those of ordinary skill in the art, the solution can be implemented in a wide ranges of usages. For example, the solution can be used in FETs, passive devices, parasitic elements and interconnect/BEOL models. In addition, the solution can be used in macro models for logic delay circuits such as shown in FIG. 7. For example, the delay variations between stage m and stage (m+1) can be separated into correlated and uncorrelated components. By using the solution of the present invention, it is possible to get a Monte Carlo model (N=8 in the example of FIG. 7) and then explore various corners for timing closure, in accordance with the invention.

While the invention has been described in terms of embodiments, those skilled in the art will recognize that the invention can be practiced with modifications and in the spirit and scope of the appended claims.

What is claimed is:

1. A method of modeling stochastic behavior of a system of N similar statistical variables using N uncorrelated/independent random model parameters, comprising:
    providing a system of N similar statistical variables, wherein each stochastic variable has a same standard deviation, and N is equal to or greater than two;
    partially correlating each and every pair of stochastic variables among N variables using a computing processor, wherein a degree of partial correlation is a same for all pairs of variables and there are N(N−1)/2 pairs;
    constructing a statistical model to represent a system of N stochastic variables in which only N independent stochastic model parameters are used using the computing processor;
    establishing a one to one mapping relation between N model parameters and the N variables;
    finding unique values of the N model parameters given a set of values of the N variables; and finding values of the N variables given a set of values of the N model parameters.

2. The method of claim 1, wherein the system of N similar statistical variables include various VLSI circuit examples, semiconductor device examples and semiconductor device model examples.

3. The method of claim 1, further-comprising partially correlating each and every pair of stochastic variables among N variables, where a degree of partial correlation is a same for all pairs of variables, where there are N(N−1)/2 pairs.

4. The method of claim 1, further comprising providing an irreducible representation of N-instance statistical model, wherein the irreducible representation provides a one-to-one mapping relation between instance values and their representation in statistical simulation space.

5. The method of claim 1, wherein a mismatch amount is related to the linear correlation coefficient $r_{ij}$ through a relation $$\langle (F_i - F_j)^2 \rangle = 2\sigma_F^2 (1 - r_{ij}), i \neq j, i,j = 1, 2, 3, \ldots.$$

wherein $F_1, F_2, \ldots, F_N$ are the N statistical variables, and $\sigma_F$ is a standard variation of each of N stochastic variable.

6. The method of claim 1, wherein the statistical model reproduces required at least one-body statistics, $$\langle (F_i - f_0)^2 \rangle^{1/2} = \sigma_F, i = 1, 2, \ldots, N,$$

and two-body statistics, $$\langle (F_i - F_j)^2 \rangle^{1/2} = \sqrt{2} \sigma_r, i \neq j, i,j = 1, 2, 3, \ldots, N.$$

7. The method of claim 1, wherein the mapping is given by:

$$\begin{pmatrix} F_1 \\ F_2 \\ F_3 \\ \vdots \\ F_N \end{pmatrix} = f_0 \begin{pmatrix} 1 \\ 1 \\ 1 \\ \vdots \\ 1 \end{pmatrix} + U_{N \times N} \begin{pmatrix} \sqrt{N} \sigma_{sym} g_1 \\ \sigma_r g_2 \\ \sigma_r g_3 \\ \vdots \\ \sigma_r g_N \end{pmatrix}, \quad (1)$$

$$\sigma_{sym} = \sqrt{\sigma_F^2 - \left(1 - \frac{1}{N}\right)\sigma_r^2},$$

$$U_{N \times N} = [U_{ij}]_{N \times N}$$

$$= \begin{pmatrix} \frac{1}{\sqrt{N}} & \frac{1}{\sqrt{2 \cdot 1}} & \frac{1}{\sqrt{3 \cdot 2}} & \cdots & \frac{1}{\sqrt{N(N-1)}} \\ \frac{1}{\sqrt{N}} & -\frac{2-1}{\sqrt{2 \cdot 1}} & \frac{1}{\sqrt{3 \cdot 2}} & \cdots & \frac{1}{\sqrt{N(N-1)}} \\ \frac{1}{\sqrt{N}} & 0 & -\frac{3-1}{\sqrt{3 \cdot 2}} & \cdots & \frac{1}{\sqrt{N(N-1)}} \\ \vdots & \vdots & \vdots & \ddots & \vdots \\ \frac{1}{\sqrt{N}} & 0 & 0 & \cdots & -\frac{N-1}{\sqrt{N(N-1)}} \end{pmatrix},$$

wherein matrix elements are $U_{i1} = 1/\sqrt{N}, i = 1, 2, \ldots, N;$ $$U_{jj} = -\frac{j-1}{\sqrt{j(j-1)}},$$

$j = 2, 3, \ldots, N;$ $U_{ij} = 0, j = 2, 3, \ldots, N,$

-continued $i > j;$ and $$U_{ij} = \frac{1}{\sqrt{j(j-1)}},$$

$j = 2, 3, \ldots, N,$ $i < j;$ wherein $F_1, F_2, \ldots, F_N$ are the N statistical variables, and, $f_0$ is the average value of variable $F_i, i = 1, 2, \ldots, N$, $g_1, g_2, \ldots, g_N$ are the N stochastic model parameters which provide the mapping from N model parameters to N variables; and the matrix $U_{N \times N}$ is an N-by-N normal-orthogonal matrix; and any variable is similar to any other variables, an exchange of any two rows of the $U_{N \times N}$ matrix; and further comprising:

multiplying all elements of $i^{th}$ column of the $U_{N \times N}$ matrix by −1 which corresponds to replacing $g_i$ by $-g_i$ equation (1).

8. The method of claim 1, wherein the modeling method uniquely determines the values of N model parameters given the values of the N stochastic variables, $$\begin{pmatrix} g_1 \\ g_2 \\ g_3 \\ \vdots \\ g_N \end{pmatrix} = \frac{1}{\sigma_r} \begin{pmatrix} \sigma_r/(\sqrt{N} \sigma_{sym}) & 0 & 0 & \cdots & 0 \\ 0 & 1 & 0 & \cdots & 0 \\ 0 & 0 & 1 & & 0 \\ \vdots & \vdots & \vdots & \ddots & \vdots \\ 0 & 0 & 0 & \cdots & 1 \end{pmatrix} U_{N \times N}^T \begin{pmatrix} F_1 - f_0 \\ F_2 - f_0 \\ F_3 - f_0 \\ \vdots \\ F_N - f_0 \end{pmatrix},$$

where $U_{N \times N}^T$ is the transpose of the matrix $U_{N \times N}$.

9. The method of claim 1, wherein each of the N stochastic variable is an independent stochastic variable, and the N independent stochastic variables form an N-dimensional space.

10. The method of claim 1, further comprising providing a mismatch problem for at least one of VLSI design, macro models for VLSI logic delay circuits, semiconductor device design and semiconductor device modeling, which includes contributions from both correlated variations and uncorrelated variations.

11. The method of claim 10, further comprising treating N instances of a device as N similar statistical variables, treating N stages of a VLSI delay circuit as N similar statistical variables, and treating N instances of a device model parameter as N similar statistical variables, and providing the one-to-one mapping relation between instance values and their representation, wherein the modeling method includes N independent stochastic variables, and is a set of stochastic functions defined in an N-dimensional space.

12. The method of claim 10, wherein each and every stochastic variable of all examples has a same standard deviation, which includes contributions from both correlated variations and uncorrelated variations.

13. The method of claim 1, wherein the modeling is at least a statistical model providing the one-to-one mapping relation and the one-to-one mapping relation is between instance values and their representation.

14. The method of claim 13, wherein at least one of: (i) the statistical model in VLSI circuit simulation is a Monte Carlo model for Monte Carlo simulations of VLSI circuits and the Monte Carlo model represents $g_1, g_2, \ldots, g_N$ by N independent Gaussian distributions; and (ii) the statistical model in VLSI circuit simulation is a corner model in which each of $g_1$, $g_2, \ldots, g_N$ is an independent skewing parameter for corner simulation of VLSI circuits.

15. A computer program product comprising a computer non-transitory usable storage medium having readable program code embodied in the medium, the computer program product includes at least one component with the readable program code executable to:

provide a system of N similar statistical variables, wherein each stochastic variable has a same standard deviation, and N is equal to or greater than two;

partially correlating each and every pair of stochastic variables among N variables, wherein a degree of partial correlation is a same for all pairs of variables and there are N(N−1)/2 pairs;

construct a statistical model to represent a system of N stochastic variables in which only N independent stochastic model parameters are used;

establish a one to one mapping relation between N model parameters and the N variables;

find unique values of the N model parameters given a set of values of the N variables; and find values of the N variables given a set of values of the N model parameters.

* * * * *